United States Patent
Widenor (10) Patent No.: US 12,377,684 B2
(45) Date of Patent: Aug. 5, 2025

(54) NON-PNEUMATIC TIRE HAVING MULTILAYER SPOKES

(71) Applicant: Bridgestone Americas Tire Operations, LLC, Nashville, TN (US)

(72) Inventor: Ross W. Widenor, Monroe Falls, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 541 days.

(21) Appl. No.: 17/770,864

(22) PCT Filed: Oct. 19, 2020

(86) PCT No.: PCT/US2020/056280
§ 371 (c)(1),
(2) Date: Apr. 21, 2022

(87) PCT Pub. No.: WO2021/096643
PCT Pub. Date: May 20, 2021

(65) Prior Publication Data
US 2022/0371366 A1    Nov. 24, 2022

Related U.S. Application Data (60) Provisional application No. 62/934,866, filed on Nov. 13, 2019.

(51) Int. Cl.
  *B60C 7/14* (2006.01)
  *B60B 9/26* (2006.01)
  *B60C 7/18* (2006.01)
(52) U.S. Cl.
  CPC ............... *B60C 7/146* (2021.08); *B60B 9/26* (2013.01); *B60C 7/18* (2013.01)

(58) Field of Classification Search
  CPC .. B60C 7/146; B60C 7/18; B60C 7/14; B60B 9/02; B60B 9/10; B60B 9/04; B60B 9/26
  See application file for complete search history.

(56) References Cited

U.S. PATENT DOCUMENTS 4,258,770 A * 3/1981 Davis ...................... C08L 21/00
                                                       152/565
5,789,080 A * 8/1998 Grimberg .................. C08J 5/06
                                                       427/535

(Continued)

FOREIGN PATENT DOCUMENTS

CN     207889455     9/2018
JP     H10217720     8/1998

(Continued)

OTHER PUBLICATIONS

Supplentary Search Report; Corresponding EP Application No. 20887215; Issue Date of Report Nov. 20, 2023.

(Continued)

*Primary Examiner* — Jason R Bellinger
(74) *Attorney, Agent, or Firm* — Shaun J. Fox; Bryan J. Jaketic (57) ABSTRACT

A non-pneumatic tire includes an annular inner ring, an annular outer ring, and a support structure extending from the annular inner ring to the annular outer ring. The support structure includes a multilayer structure. The multilayer structure includes a skim layer, a plurality of cords embedded in the skim layer, and an outer protective layer covering at least a portion of a surface of the skim layer. The outer protective layer has greater resistance to ozone exposure than the skim layer. Methods of making a non-pneumatic tire include forming a multilayer structure by applying an outer protective layer to at least a portion of a surface of a skim layer having a plurality of cords embedded in the skim layer.

6 Claims, 6 Drawing Sheets

(56) References Cited

U.S. PATENT DOCUMENTS

| | | | |
|---|---|---|---|
| 7,418,988 B2* | 9/2008 | Cron | B60C 9/18 |
| | | | 152/5 |
| 9,694,517 B2* | 7/2017 | Delfino | B60C 9/005 |
| 10,286,725 B2* | 5/2019 | Celik | B60B 9/26 |
| 10,569,601 B2* | 2/2020 | Reinhardt | B60C 7/22 |
| 10,682,886 B2* | 6/2020 | Talbot | B60C 9/1807 |
| 11,014,407 B2* | 5/2021 | Manesh | B29C 43/003 |
| 11,577,548 B2* | 2/2023 | Cron | B60C 7/14 |
| 2004/0069385 A1* | 4/2004 | Timoney | B60B 9/26 |
| | | | 152/69 |
| 2009/0243371 A1* | 10/2009 | Karlsson | B60B 9/26 |
| | | | 301/35.59 |
| 2017/0008342 A1* | 1/2017 | Martin | B60C 7/22 |
| 2018/0001705 A1* | 1/2018 | Wilson | B29D 30/02 |
| 2018/0354304 A1 | 12/2018 | Haidet et al. | |
| 2023/0271450 A1* | 8/2023 | Widenor | B29D 30/02 |
| | | | 152/1 |

FOREIGN PATENT DOCUMENTS

| | | |
|---|---|---|
| JP | 2003-072316 | 3/2003 |
| JP | 2008132951 | 6/2008 |
| WO | 2017072562 | 5/2017 |
| WO | 2019005821 | 1/2019 |
| WO | 2019051493 | 3/2019 |
| WO | 2019125459 A1 | 6/2019 |

OTHER PUBLICATIONS

International Preliminary Report on Patentability; Corresponding PCT Application No. PCT/US2020/056280; Authorized Officer Athina Nickitas-Etienne; Issue Date of Report May 17, 2022.

Zheng Yunsheng, Automobile Tire Retreading and Repair, Published by China Communications Press, Distributed by Beijing Distribution Office, Xinhua Bookstore, Dealt by Xinhua Bookstore, Printed by China Communications Press Publishing House; 1st Edition in Apr. 1985 (English Translation).

Regulations for Technical Storage of Materials, Chemical Industry, Light Industry and Building Materials Compiled by State Administration of Materials, 4th Volume, Published by Standards Press of China; 1st Edition in Mar. 1982, Printed for the Second Time in Aug. 1983 (English Translation).

Zhuang Jide, Advanced Technology of Tire, Beijing Institute of Technology Press, China Archives of Publications CIP Data HZ (2000) No. 88180; 1st Edition in Mar. 2001, Printed for the First Time in Mar. 2001 (English Translation).

* cited by examiner

NON-PNEUMATIC TIRE HAVING MULTILAYER SPOKES

CROSS-REFERENCE TO RELATED APPLICATIONS

This application is a U.S. National Stage entry of PCT/US2020/056280 filed on Oct. 19, 2020, which in turn claims the benefit of U.S. Provisional Patent Application No. 62/934,866 filed on Nov. 13, 2019. Both of these documents are incorporated herein by reference in their entirety.

FIELD OF INVENTION

The present disclosure relates to non-pneumatic tires having multilayer support structures. More particularly, the present disclosure relates to non-pneumatic tires having multilayer spokes.

BACKGROUND

While various tire constructions enable a tire to run in an uninflated or underinflated condition, non-pneumatic tires do not require inflation. Rather, non-pneumatic tires include a plurality of spokes, webbing, cells, or other open-sided support structure that connects an inner ring to an outer ring. Some non-pneumatic tires include a tread mounted to the outer ring and a rim mounted to the inner ring.

The open-sided support structure of a non-pneumatic tire undergoes various loading conditions in operation. Moreover, dirt, water, snow, sand, mud, or other debris can come into contact with or accumulate on the open-sided support structure. While the support structure is constructed of materials selected to provide desirable structural characteristics, certain materials degrade when exposed to environmental factors. Accordingly, a spoke for a non-pneumatic tire capable of undergoing the various loading conditions of a tire while also withstanding exposure to harmful environmental factors is needed.

SUMMARY OF THE INVENTION

In one embodiment, a non-pneumatic tire includes an annular inner ring, an annular outer ring, and a support structure extending from the annular inner ring to the annular outer ring. The support structure includes a multilayer structure. The multilayer structure includes a skim layer, a plurality of cords embedded in the skim layer, and an outer protective layer covering at least a portion of a surface of the skim layer.

In another embodiment, a non-pneumatic tire includes an annular inner ring, an annular outer ring, and a support structure extending from the annular inner ring to the annular outer ring. The support structure includes a first support element including a first skim layer, a first plurality of cords embedded in the first skim layer, and a first outer protective layer covering at least a portion of a surface of the first skim layer; and a second support element including a second skim layer, a second plurality of cords embedded in the second skim layer, and a second outer protective layer covering at least a portion of a surface of the second skim layer. The first and second support elements are coupled at an interface.

In yet another embodiment, a method of making a non-pneumatic tire includes the steps of: forming a multilayer structure, incorporating the multilayer structure into a support structure, and positioning the support structure extending from an annular inner ring to an annular outer ring. The step of forming a multilayer structure includes applying an outer protective layer to at least a portion of a surface of a skim layer having a plurality of cords embedded in the skim layer. The outer protective layer has greater resistance to ozone exposure than the skim layer.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
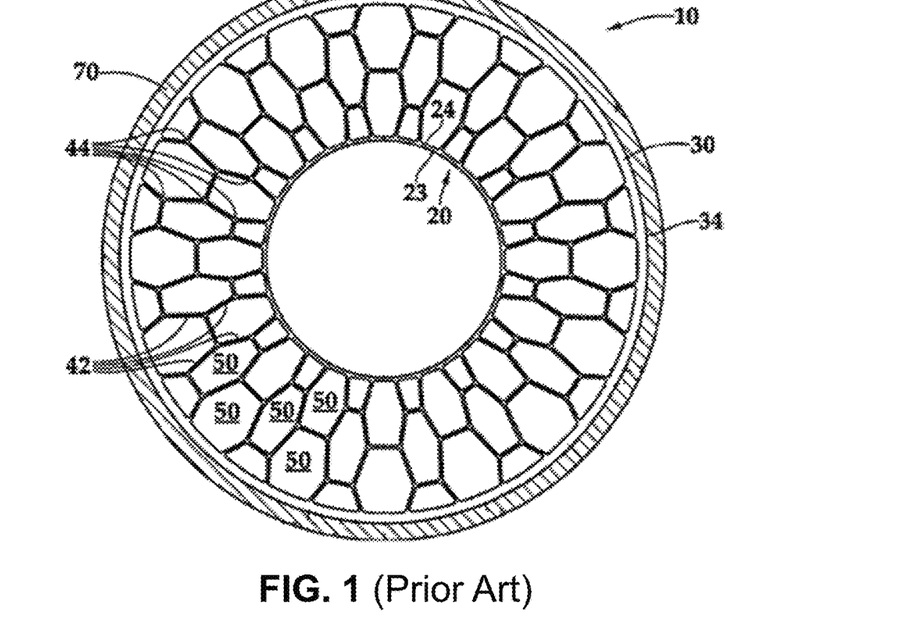
FIG. 1 is a front view of an undeformed non-pneumatic tire known in the prior art.
Figure 2:
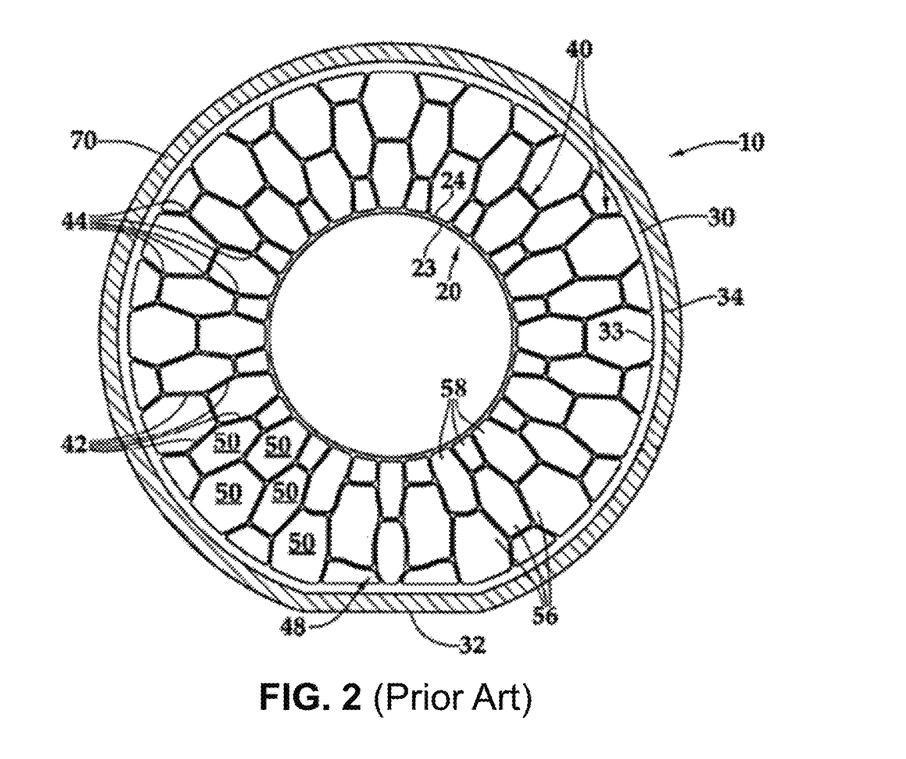
FIG. 2 is a front view of the non-pneumatic tire of FIG. 1 being deformed when subjected to a load.

FIGS. 1 and 2 illustrate one embodiment of a non-pneumatic tire 10 known in the art. The non-pneumatic tire 10 is merely an exemplary illustration of a tire that may be used with one or more of a rim assembly, a tread, and a multilayer spoke. It is not intended to be limiting.

In the illustrated embodiment, the non-pneumatic tire 10 includes a generally annular inner ring 20 that has an internal surface 23 and an external surface 24 and a generally annular outer ring 30 that has an internal surface 33 and an external surface 34. One or both of the generally annular inner ring 20 and the generally annular outer ring 30 can be made of cross-linked or uncross-linked polymers. In this disclosure, the term "polymer" means cross-linked or uncross-linked polymers. In some embodiments, one or more of the generally annular inner ring 20 and the generally annular outer ring 30 can be made of metal (e.g., steel, aluminum, etc.).

The non-pneumatic tire 10 further includes an interconnected web 40 that connects the generally annular inner ring 20 and the generally annular outer ring 30. The interconnected web 40 is a support structure extending radially from the outer surface 24 of the generally annular inner ring 20 to the inner surface 33 of the generally annular outer ring 30.

In the illustrated embodiment, the interconnected web 40 has at least two radially adjacent layers 56, 58 of web elements 42, 44 that define a plurality of generally polygonal openings 50. In alternative embodiments, a plurality of spokes or other open-celled support structure can connect the inner ring 20 to the outer ring 30.

In one embodiment, the generally annular inner ring 20 and the generally annular outer ring 30 are made of the same material as the interconnected web 40. The generally annular inner ring 20, the generally annular outer ring 30, and the interconnected web 40 can be made by injection or compression molding, castable polymer, additive manufacturing, or any other method generally known in the art and can be formed at the same time so that their attachment is formed by the material comprising the inner ring 20, the outer ring 30, and the interconnected web 40 cooling and setting.

The internal surface 23 of the generally annular inner ring 20 is configured to engage a rim assembly (not shown) to which the tire 10 is mounted. A tread layer 70 is attached to the outer surface 34 of the generally annular outer ring 30. Attachment can be done adhesively or using other methods commonly available in the art.

As shown in FIG. 2, the outer ring 30 can be configured to deform in an area 48 around and including a footprint region 32 of the tread layer 70, which decreases vibration and increases ride comfort of the tire 10.

Figure 3:
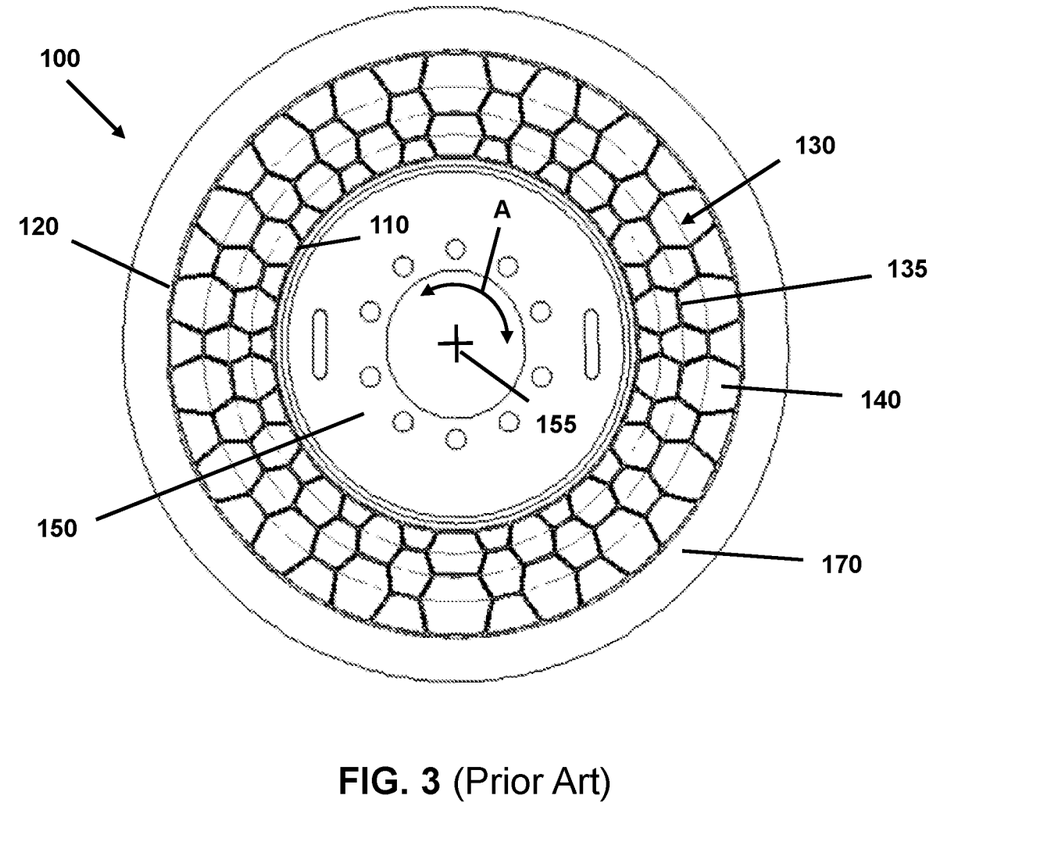
FIG. 3 is a front view of a non-pneumatic tire known in the prior art including a rim assembly.

FIG. 3 illustrates a front view of an embodiment of a tire 100 known in the art having a generally annular inner ring 110, a generally annular outer ring 120, and an internal support structure in the form of a flexible, interconnected web 130 extending between the inner ring 110 and the outer ring 120. The flexible, interconnected web 130 is formed by a plurality of web elements 135 that define polygonal openings 140. In this particular embodiment, the web elements 135 form a plurality of hexagonal and substantially trapezoidal shapes, including an outer series of alternating hexagonal and trapezoidal opening and an inner series of alternating hexagonal and trapezoidal openings. It should be understood that the geometries shown in FIGS. 1-3 are merely exemplary and that any geometries may be employed. Similarly, spokes or other support structure may be employed to provide an interconnected web.

FIG. 3 additionally shows the tire 100 mounted on a wheel assembly 150 at the generally annular inner ring 110. The wheel assembly 150 may be rotated about rotation axis 155 (as shown by arrow A). Rotation can be imparted by an axle of a vehicle, or by other means to rotate the tire 100. A tread 170 is attached to the generally annular outer ring 120. The tread 170 can be manufactured from rubber or other elastomeric material.

FIGS. 4-7 show example embodiments of different types of non-pneumatic tires 200. For simplicity, the non-pneumatic tires 200 of FIGS. 4-7 are illustrated without a tread and rim assembly, both of which may be substantially the same as wheel assembly 150 and tread 170 described with respect to the tire 100 of FIG. 3. Like reference numerals are used for like components.

Figure 4:
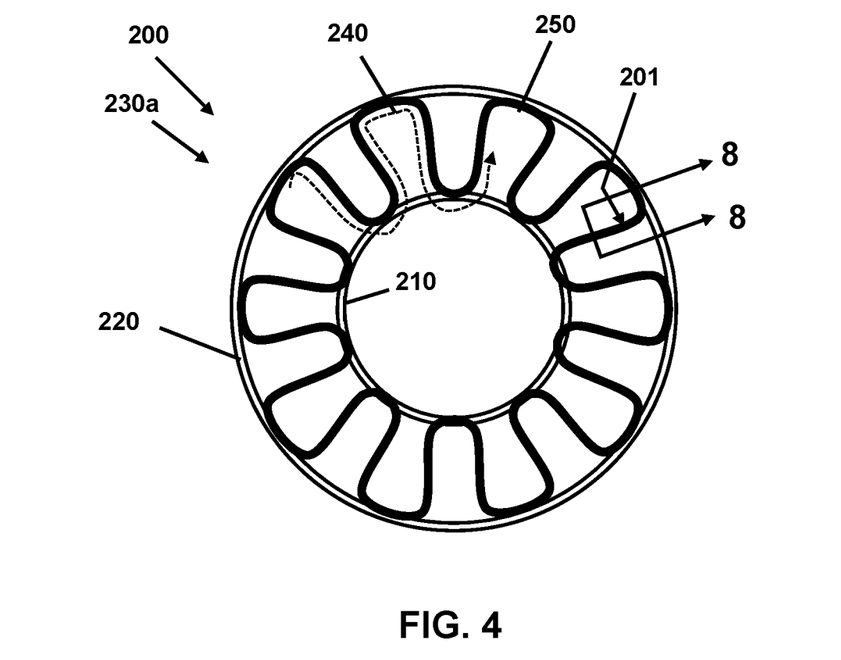
FIG. 4 is a front view of one embodiment of a non-pneumatic tire including a multilayer undulating spoke.

FIG. 4 shows an example of a non-pneumatic tire 200 having a generally annular inner ring 210, a generally annular outer ring 220, and an undulating spoke 230a extending between the generally annular inner ring 210 and the generally annular outer ring 220. As represented by arrow 240, the undulating spoke 230a can be formed by winding a sheet or ribbon 250 of spoke material back and forth between the generally annular inner ring 210 and the generally annular outer ring 220 in an undulating pattern.

Figure 5:
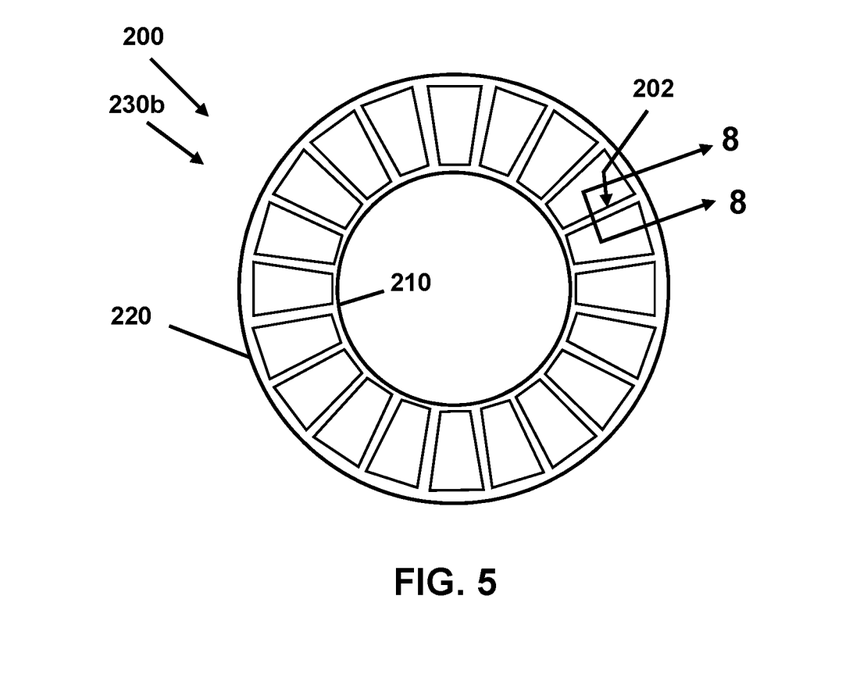
FIG. 5 is a front view of another embodiment of a non-pneumatic tire including a multilayer linear spoke.

FIG. 5 shows an example of a non-pneumatic tire 200 having a generally annular inner ring 210, a generally annular outer ring 220, and a plurality of linear spokes 230b extending between the generally annular inner ring 210 and the generally annular outer ring 220. In the illustrated embodiment, the plurality of linear spokes 230b extend in a substantially radial direction. In alternative embodiments (not shown), the plurality of linear spokes extend at an angle with respect to the radial direction. In one such embodiment, the plurality of linear spokes are generally parallel to each other. In an alternative embodiment, the plurality of linear spokes extend at diverging angles.

The plurality of linear spokes 230b can be manufactured by securing a linear spoke 202 between the generally annular inner ring 210 and the generally annular outer ring 220. Alternatively, the plurality of linear spokes 230b can be formed, molded, or manufactured to provide each linear spoke 202 as an integral component of the plurality of linear spokes 230b.

Figure 6:
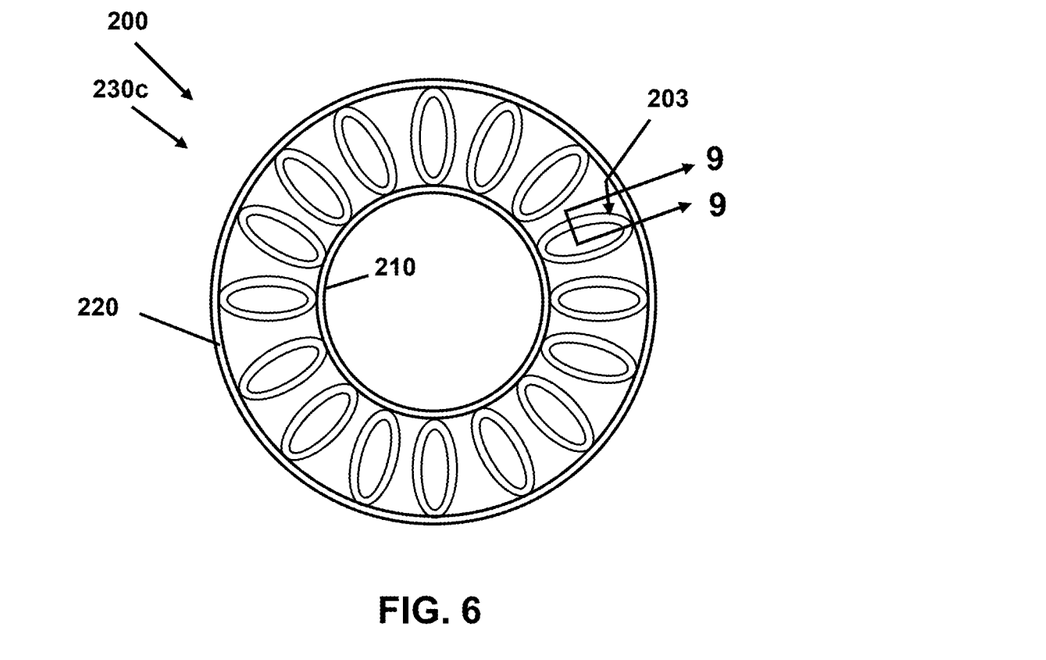
FIG. 6 is a front view of yet another embodiment of a non-pneumatic tire including a multilayer non-linear spoke.

FIG. 6 shows an example of a non-pneumatic tire 200 having a generally annular inner ring 210, a generally annular outer ring 220, and a plurality of non-linear spokes 230c extending between the generally annular inner ring 210 and the generally annular outer ring 220. Each non-linear spoke 203 is illustrated as an oval-shaped loop, although other shaped spokes (e.g., circular, rectangular, trapezoidal, polygonal, curved, wave-shaped, irregular-shaped, etc.) may be employed in further embodiments. While non-linear spoke 203 is illustrated as a continuous loop, non-continuous structures (e.g., U-shaped, V-shaped, S-shaped, arc-shaped, etc.) may also be employed. In the illustrated embodiment, each non-linear spoke 203 is radially spaced from adjacent spokes such that there is a space between adjacent spokes. The plurality of non-linear spokes 230c can be manufactured by securing each non-linear spoke 203 between the generally annular inner ring 210 and the generally annular outer ring 220.

Figure 7:
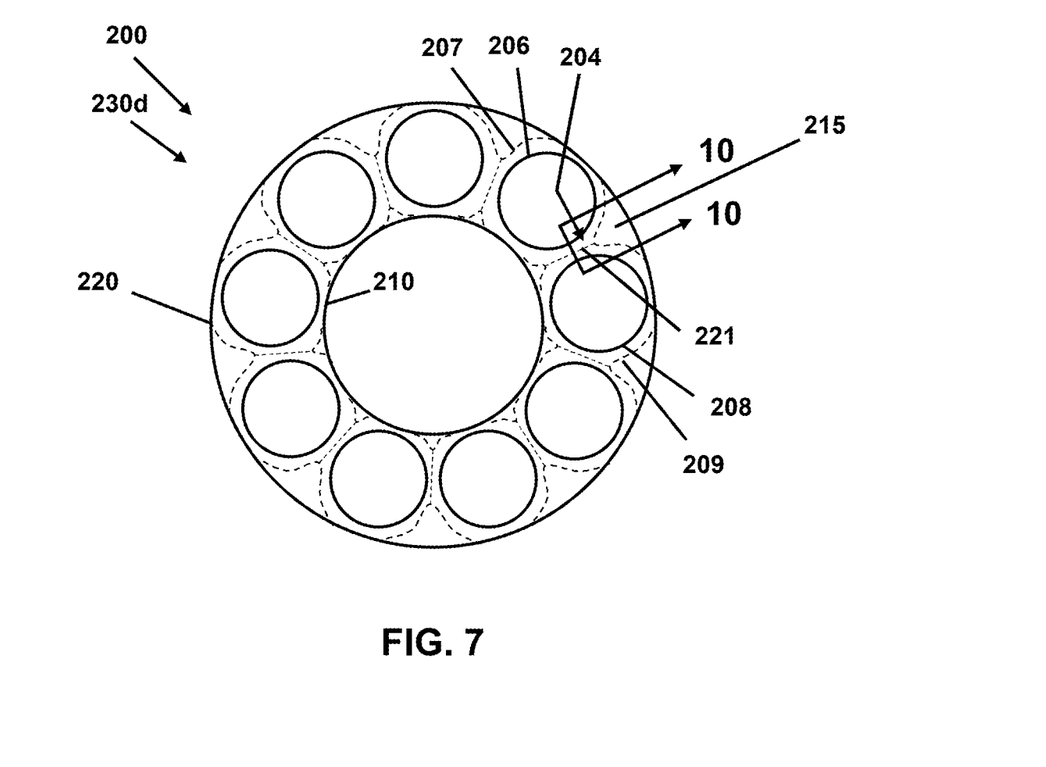
FIG. 7 is a front view of still another embodiment of a non-pneumatic tire including a multilayer spoke including an interface.

FIG. 7 shows an example of a non-pneumatic tire 200 having a generally annular inner ring 210, a generally annular outer ring 220, and a plurality of spokes 230d extending between the generally annular inner ring 210 and the generally annular outer ring 220. Each spoke 204 is formed as the structure between at least two adjacent voids 206, 208. In the illustrated embodiment, each spoke 204 is the structure between adjacent circular voids 206, 208, although other shaped voids (e.g., oval, rectangular, trapezoidal, polygonal, etc.) may be employed in further embodiments. The voids 206, 208 can be formed, molded, or manufactured into the plurality of spokes 230d to provide the plurality of spokes 230d as an integral component. Alternatively, the plurality of spokes 230d can be manufactured by securing a plurality of continuous structures (e.g., circular, rectangular, trapezoidal, polygonal, etc.) or non-continuous structures (e.g., U-shaped, V-shaped, S-shaped, arc-shaped, etc.) between the generally annular inner ring 210 and the generally annular outer ring 220.

For example, as represented by the dashed lines in FIG. 7, the plurality of spokes 230d may be formed by securing a first circular loop 207 and a second circular loop 209 between the generally annular inner ring 210 and the generally annular outer ring 220 with the first circular loop 207 contacting the second circular loop 209 at an interface 221. The first circular loop 207 and the second circular loop 209 are coupled together at the interface 221 by one or more of a mechanical fastener (e.g., bolt, clamp, bracket), adhesive (e.g., glue, welding, brazing, or a chemical bonding process, which may include heating, or other method of coupling).

In some embodiments, the method of coupling the first circular loop 207 and the second circular loop 209 may fuse materials of the first circular loop 207 with materials of the second circular loop 209 to form the interface 221 as a continuous boundary. Alternatively, in some embodiments, the method of coupling the first circular loop 207 and the second circular loop 209 may form the interface 221 as a non-continuous boundary. Irrespective of whether the interface 221 of the multilayer spoke 204 is continuous or non-continuous, additional material 215 may optionally be added between the first circular loop 207 and the second circular loop 209 to fill gaps and provide additional support to the multilayer spoke 204.

While FIGS. 4-7 show non-pneumatic tires having spokes, it should be understood that non-pneumatic tires may have other support structures such as an interconnected web. For example, an interconnected web may be formed by a lower set of spokes and an upper set of spokes, each set of spokes being similar to one of the embodiments shown or described above.

Figure 8:
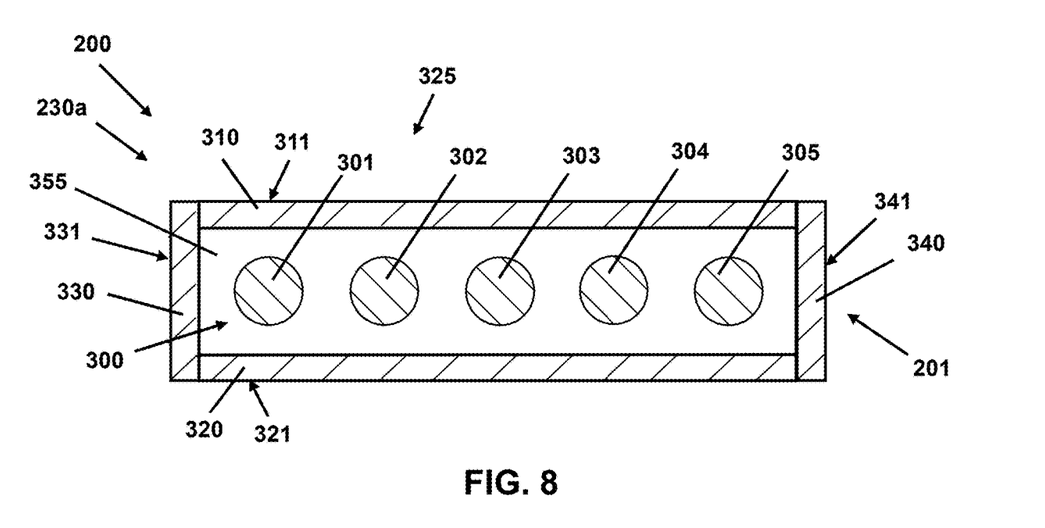
FIG. 8 is a partial cross-sectional view of a spoke of FIG. 4 taken along line 8-8 of FIG. 4 showing a cross-sectional view of a multilayer undulating spoke that is also representative of a partial cross-sectional view of a spoke of FIG. 5 taken along line 8-8 of FIG. 5 showing a cross-sectional view of a multilayer linear spoke.

FIG. 8 shows a cross-sectional view of a portion of the non-pneumatic tire 200 taken along line 8-8 of FIG. 4 showing the multilayer undulating spoke 230a. The multilayer undulating spoke 230a includes a plurality of cords 300 embedded in a skim layer 355. Each cord 301, 302, 303, 304, 305 of the plurality of cords 300 may be constructed of metal (e.g., steel, brass, brass-plated steel) to provide structural support and reinforcement to the multilayer undulating spoke 230a. Other examples of materials from which one or more of the plurality of cords 300 may be constructed include polymeric materials, thermoplastic polymer resins such as polyethylene terephthalate (PET), nylon, rayon, natural cotton, or other tire reinforcement material. The skim layer 355 may be a rubber compound formulated to adhere to the cords 301-305. For example, the skim layer 355 may be a rubber compound including cobalt formulated to adhere to brass-plated steel cords 301-305. Other examples of rubber compounds formulated to adhere to the plurality of cords 300 from which the skim layer 355 may be constructed include resorcinol formaldehyde latex chemistry in the case of a polymeric reinforcing material. The multilayer undulating web spoke 230a further includes an outer protective layer 325. The outer protective layer 325 abuts the skim layer 355 and provides the multilayer undulating spoke 230a with improved resistance to ozone degradation. That is, relative to the skim layer 355, the outer protective layer 325 is formulated to have material properties that are better at withstanding exposure to the ozone than the skim layer 355. The outer protective layer 325 may include tire sidewall compound, veneer compound, synthetic rubber such as ethylene propylene diene monomer (EPDM) rubber, neoprene, butyl rubber, a hydrogenated diene rubber, or other compounds formulated to withstand exposure to ozone.

The open-sided support structure (i.e., undulating spoke 230a) of a non-pneumatic tire 200 undergoes various loading conditions in operation and is, therefore, constructed to undergo such loading. For example, the plurality of cords 300 embedded in the skim layer 355 may be constructed to undergo such loading. Moreover, air, road dirt, water, snow, sand, mud, or other debris can come into contact with or accumulate on the undulating spoke 230a. While the undulating spoke 230a, including the plurality of cords 300 and the skim layer 355, is constructed of materials selected to provide desirable structural characteristics, certain materials degrade when exposed to environmental factors (e.g., ozone). In particular, the skim layer 355 may not be suitable for exposure to ozone. As noted, the skim layer 355 is formulated to adhere to the cords 301-305. Such formulation, while providing good adhesion to the cords 301-305, may render the skim layer 355 susceptible to degradation from ozone exposure. Without being bound by theory, it is believed that re-formulating the skim layer 355 to be more ozone resistant reduces the adhesion characteristics of the skim layer 355 relative to the plurality of cords 300. Thus, with an outer protective layer 325 that is more ozone resistant than the skim layer 355, the skim layer 355 adheres suitably to the plurality of cords 300 and the outer protective layer 325 suitably protects the skim layer 355 and cords 300 from exposure to ozone and other environmental factors.

Additional features of multilayer spokes 201-204 for a non-pneumatic tire 200 are described with respect to FIGS. 8-11 with the understanding that one or more features of one or more spokes 201-204 can be provided alone or in combination to provide a multilayer spoke for a non-pneumatic tire 200 without departing from the scope of the disclosure. Thus, one or more features of one or more multilayer spokes 201-204 can be provided alone or in combination to provide one or more of the spoke structures 130, 230a, 230b, 230c, 230d discussed with respect to FIGS. 3-7. Like reference numerals are used for like features. Accordingly, the multilayer spokes 201-204 for a non-pneumatic tire 200 of the present disclosure are capable of undergoing the various tire loading conditions while also withstanding exposure to harmful environmental factors.

Referring to FIG. 8, the multilayer undulating spoke 230a includes an outer protective layer 325 that circumscribes the skim layer 355, entirely enclosing the skim layer 355 and thus covering any outer surfaces of the skim layer 355 with respect to the environment. The cross-sectional view of FIG. 8, showing the cross-sectional view of a portion 201 of multilayer undulating spoke 230a taken along line 8-8 of FIG. 4 is also illustrative of the cross-sectional view of the multilayer linear spoke 202 taken along line 5-5 of FIG. 5. For simplicity and not limitation, features of the multilayer spokes 230a, 230b in FIG. 4 and FIG. 5 will be described in FIG. 8 with respect to the portion 201 of multilayer undulating spoke 230a of FIG. 4 with the understanding that the features apply in a same or similar manner with respect to multilayer linear spoke 202 of FIG. 5. Additionally, it should be understood that the cross-section shown and described with respect to FIG. 8 may be applied to any of the support structures for non-pneumatic tires shown or described above.

As shown in FIG. 8, the outer protective layer 325 includes a first outer protective layer 310 abutting the skim layer 355 on a first side of the spoke 201 and having an outer surface 311 exposed to the environment, a second outer protective layer 320 abutting the skim layer 355 on a second side of the spoke 201 and having an outer surface 321 exposed to the environment, a third outer protective layer 330 abutting the skim layer 355 on a third side of the spoke 201 and having an outer surface 331 exposed to the environment, and a fourth outer protective layer 340 abutting the skim layer 355 on a fourth side of the spoke 201 and having an outer surface 341 exposed to the environment. Although shown as separate protective layers 310, 320, 330, 340, the outer protective layer 325 can be provided as a single, continuous protective layer circumscribing the outer surfaces 311, 321, 331, 341 of the skim layer 355.

Although illustrated as a rectangular cross-section with a skim layer 355 having four sides, the multilayer spoke 201 may define other shaped cross-sections (e.g., triangular, square, trapezoidal, polygonal, circular, oval, etc.) such that the skim layer 355 includes one or more sides. The outer protective layer 325 is provided on at least a portion of one or more sides of the skim layer 355 to protect the skim layer 355 from the environment. For example, in some embodiments, outer protective layer 330 and 340 may be optionally omitted, in which case, a portion of the skim layer 355 may be exposed to the environment. In such instances, without being bound by theory, it is believed that exposing a relatively small surface area of the skim layer 355 to the environment while protecting a relatively larger surface area of the skim layer 355 from the environment with the outer protective layers 310, 320 can provide the spoke structure 230*a* capable of undergoing the various tire loading conditions while also withstanding exposure to harmful environmental factors. Thus, unless otherwise noted, it should be understood that the outer protective layer 325 can cover at least a portion of the skim layer 355 in some embodiments and the entire skim layer 355 in other embodiments without departing from the scope of the disclosure.

The manner in which the plurality of cords 300 are embedded in the skim layer 355 is not intended to be limiting and can be accomplished with various manufacturing techniques. Likewise, unless otherwise noted, the outer protective layer 325 may be applied to the skim layer 355 in a variety of manners. For example, the plurality of cords 300, skim layer 355, and outer protective layer 325 can be manufactured by a calendaring process where rollers compress the skim layer 355 and the plurality of cords 300 together to embed the plurality of cords 300 within the skim layer 355. Prior to, at the same time as, or subsequent to embedding the plurality of cords 300 in the skim layer 355, rollers may compress the outer protective layer 325 and the skim layer 355 to provide the outer protective layer 325 on the outer surface of the skim layer 355. Alternatively, one or more of the skim layer 355, the plurality of cords 300, and the outer protective layer 325 may be co-extruded to manufacture the skim layer 325 with the plurality of cords 300 embedded therein, and the outer protective layer 325 covering the outer surface of the skim layer 325.

In other examples, the outer protective layer 325 may be applied to the skim layer 355 by one or more of dipping the skim layer 355 into a liquid state of the outer protective layer 325, applying the outer protective layer 325 to the skim layer 355 in a liquid state using direct application such as painting or spraying, or adhering the outer protective layer 325 (in solid or liquid state) to the skim layer 355 during manufacture of the skim layer 355 with the embedded cords 301-305. Moreover, although five cords 301-305 are illustrated, it should be understood that the multilayer spoke 201 can include any number of a plurality of cords 300 without departing from the scope of the disclosure.

Figure 9:
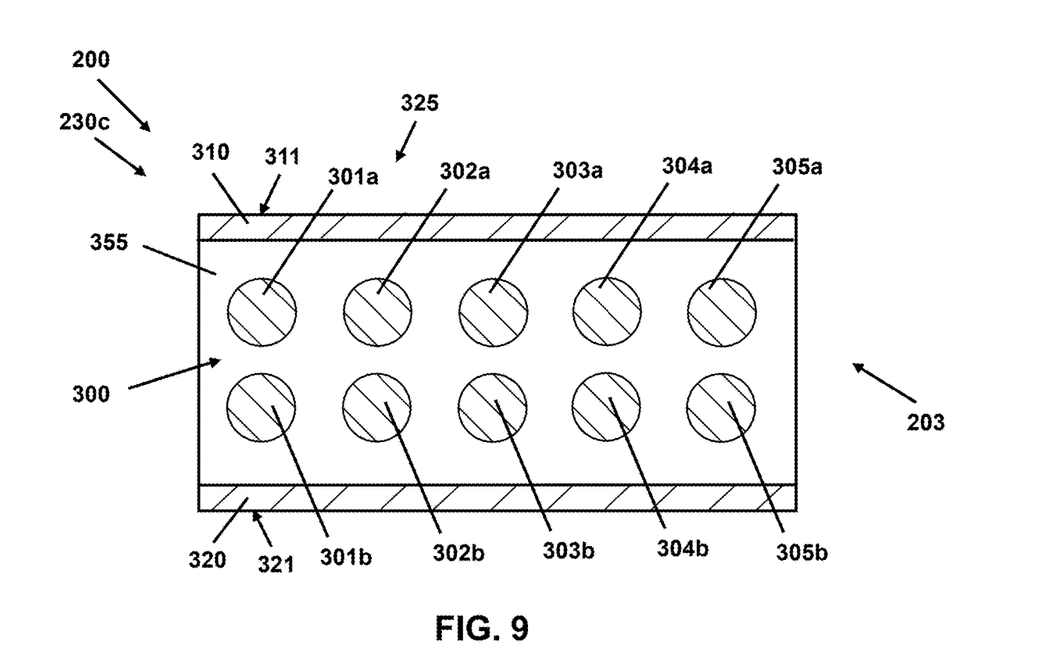
FIG. 9 is a partial cross-sectional view of a spoke of FIG. 6 taken along line 9-9 of FIG. 6 showing a cross-sectional view of a multilayer non-linear spoke.

In some embodiments, the plurality of cords 300 may be arranged in a plurality of layers. FIG. 9 shows a cross-sectional view of non-linear spoke 203 taken along line 9-9 of FIG. 6 illustrating a multilayer non-linear spoke 203 with a plurality of cords 300 arranged in two layers. The first layer includes cords 301*a*-305*a* and the second layer includes cords 301*b*-305*b*. The first layer of cords 301*a*-305*a* is aligned with the second layer of cords 301*b*-305*b*, although in other embodiments, the cords 301*a*-305*a*, 301*b*-305*b* may be offset relative to each other. Additionally, one or more cords of the plurality of cords 300 may contact (e.g., be wound, braided, overlap, or otherwise intertwined) without departing from the scope of the disclosure. Additionally, it should be understood that the cross-section shown and described with respect to FIG. 9 may be applied to any of the support structures for non-pneumatic tires shown or described above.

In the illustrated embodiment, the plurality of cords 300 extend in a radial direction. In an alternative embodiment, the plurality of cords 300 may extend in other directions, such as the axial direction, the circumferential direction, or biased at an angle with respect to the radial direction, without departing from the scope of the disclosure. The plurality of cords 300 may extend in the same direction as the multilayer spokes 201-204 or may extend in different directions relative to the direction or directions along which the multilayer spokes 201-204 extend.

The plurality of cords 300 are intended to provide structural reinforcement to the skim layer 355, and it is therefore envisioned that any combination, orientation, or configuration of cords 301*a*-305*a*, 301*b*-305*b* embedded within the skim layer 355 is within the scope of the disclosure as is any combination, orientation, or configuration of the multilayer spokes 201-204.

Figure 10:
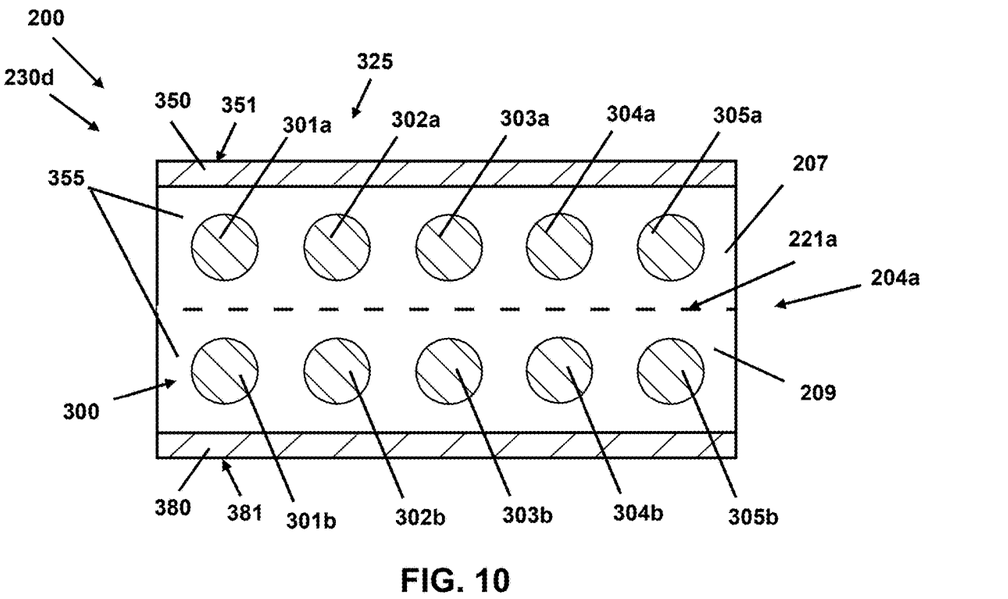
FIG. 10 is a partial cross-sectional view of one embodiment of a spoke of FIG. 7 taken along line 10-10 of FIG. 7 showing a cross-sectional view of a multilayer spoke having a continuous interface.

FIG. 10 shows a cross-sectional view of a first embodiment of a multilayer spoke 204*a* including an interface that is a continuous interface 221*a* taken along line 10-10 of FIG. 7. It should be understood that the cross-section shown and described with respect to FIG. 10 may be applied to any of the support structures for non-pneumatic tires shown or described above. In one example, the first circular loop 207 and the second circular loop 209 (see FIG. 7) may be coupled together to form the multilayer spoke 204*a* with a continuous interface 221*a*. By continuous interface 221*a* it is meant that the skim layers 355 of adjacent first and second circular loops 207, 209 abut each other and are coupled together according to any one or more of the methods of coupling described with respect to FIG. 7.

For example, such configuration arises when the first circular loop 207 and the second circular loop 209 include an outer protective layer 325 on their respective inner diameters and no outer protective layer on their respective outer diameters. As illustrated in FIG. 10, the first circular loop 207 includes outer protective layer 350 with outer surface 351 on its inner diameter and no outer protective layer on its outer diameter. Likewise, the second circular loop 209 includes outer protective layer 380 with outer surface 381 on its inner diameter and no outer protective layer on its outer diameter. Thus, when coupled together, the outer diameter of the first circular loop 207 (with its skim layer 355 exposed) abuts the outer diameter of the second circular loop 209 (with its skim layer 355 exposed). The respective abutting skim layers 355 of each circular loop 207, 209 define a continuous interface 221*a*, and the respective outer protective layers 350, 380 with outer surfaces 351, 381 protect the skim layers 355 from exposure to the environment.

Figure 11:
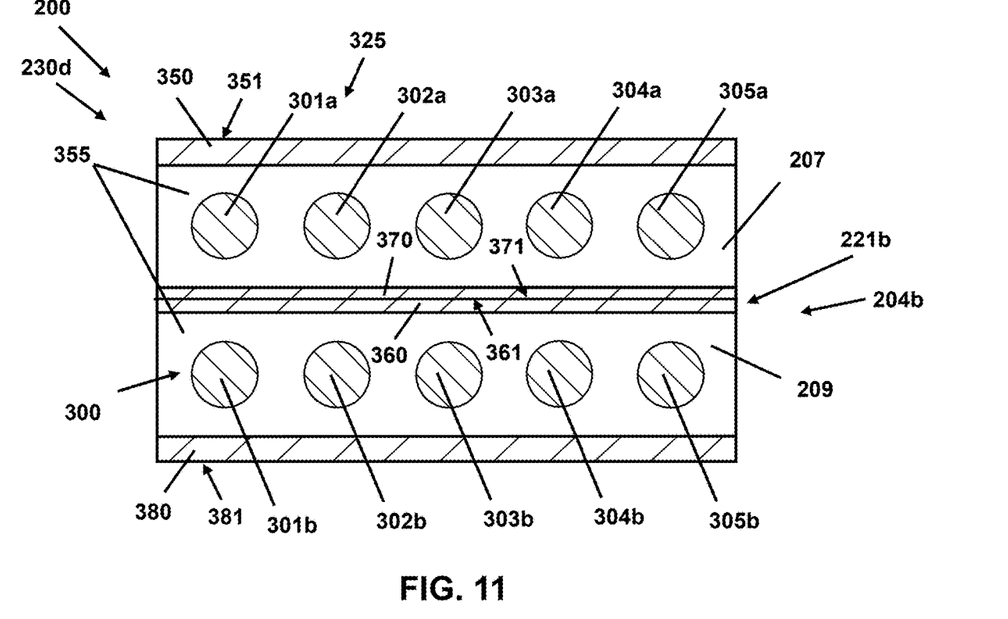
FIG. 11 is a partial cross-sectional view of another embodiment of a spoke of FIG. 7 taken along line 10-10 of FIG. 7 showing a cross-sectional view of a multilayer spoke having a non-continuous interface.

FIG. 11 shows an alternative cross-sectional view of a second embodiment of a multilayer spoke 204*b* including an interface that is a non-continuous interface 221*b* taken along line 10-10 of FIG. 7. It should be understood that the cross-section shown and described with respect to FIG. 11 may be applied to any of the support structures for non-pneumatic tires shown or described above. The first circular loop 207 and the second circular loop 209 (see FIG. 7) are coupled together to form the multilayer spoke 204b with a non-continuous interface 221b. By non-continuous interface 221b it is meant that the skim layers 355 of adjacent first and second circular loops 207, 209 do not abut each other when the first and second circular loops 207, 209 are coupled together according to any one or more of the methods of coupling described with respect to FIG. 7.

For example, such configuration arises when the first circular loop 207 and the second circular loop 209 include an outer protective layer 325 on their respective inner and outer diameters. As illustrated in FIG. 11, the first circular loop 207 includes outer protective layer 350 with outer surface 351 on its inner diameter and outer protective layer 360 with surface 361 on its outer diameter. Likewise, the second circular loop 209 includes outer protective layer 380 with outer surface 381 on its inner diameter and outer protective layer 370 with surface 371 on its outer diameter. Thus, when coupled together, surface 361 of the outer protective layer 360 of the first circular loop 207 abuts surface 371 of the outer protective layer 370 of the second circular loop 209. The respective skim layers 355 of each circular loop 207, 209 are thus separated by the abutting outer protective layers 360, 370 thereby defining a non-continuous interface 221b. The respective outer protective layers 350, 380 with outer surfaces 351, 381 protect the skim layers 355 from exposure to the environment.

For at least the reasons disclosed herein, the multilayer spokes 201-204b for a non-pneumatic tire 200 of the present disclosure are capable of undergoing the various tire loading conditions while also withstanding exposure to harmful environmental factors.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:
   an annular inner ring;
   an annular outer ring;
   a support structure extending from the annular inner ring to the annular outer ring, wherein the support structure includes a multilayer structure including:
   a skim layer formed from a rubber compound including cobalt,
   a plurality of steel cords embedded in the skim layer, and
   an outer protective layer covering at least a portion of a surface of the skim layer, wherein the outer protective layer has greater resistance to ozone exposure than the skim layer,
   wherein the support structure includes a plurality of coupled support elements each of which extends from the annular inner ring to the annular outer ring,
   wherein the plurality of coupled support elements are arranged circumferentially relative to a rotational axis of the tire with adjacent coupled support elements abutting at an interface,
   wherein the multilayer structure defines at least a portion of the interface, and
   wherein the interface is a continuous interface defined by abutting skim layers of the adjacent coupled support elements.

2. The non-pneumatic tire of claim 1, wherein the outer protective layer covers a majority of the surface of the skim layer.

3. The non-pneumatic tire of claim 1, wherein the outer protective layer covers the entire surface of the skim layer.

4. The non-pneumatic tire of claim 1, wherein the plurality of cords are arranged in a plurality of layers defined relative to a thickness of a cross-section of the multilayer structure taken normal to a direction in which at least one of the cords of the plurality of cords extends.

5. A non-pneumatic tire comprising:
   an annular inner ring;
   an annular outer ring;
   a support structure extending from the annular inner ring to the annular outer ring, wherein the support structure includes:
   a first support element including a first skim layer formed from a first rubber compound including cobalt, a first plurality of steel cords embedded in the first skim layer, and a first outer protective layer covering at least a portion of a surface of the first skim layer, wherein the first outer protective layer has a greater resistance to ozone exposure than the first skim layer, and
   a second support element including a second skim layer formed from a second rubber compound including cobalt, a second plurality of steel cords embedded in the second skim layer, and a second outer protective layer covering at least a portion of a surface of the second skim layer, wherein the first and second support elements are coupled at an interface, wherein the interface is a continuous interface defined by abutting first and second skim layers, and wherein the second outer protective layer has a greater resistance to ozone exposure than the second skim layer.

6. The non-pneumatic tire of claim 5, wherein the support structure includes a plurality of spokes and wherein at least one spoke of the plurality of spokes includes the interface.

* * * * *